United States Patent Office 3,369,037
Patented Feb. 13, 1968

3,369,037
PREPARATION OF HIGH PURITY PRIMARY
ORGANO ALUMINUM COMPOUNDS
James D. Johnston, Baton Rouge, La., assignor to Ethyl
Corporation, New York, N.Y., a corporation of Virginia
No Drawing. Filed Apr. 29, 1964, Ser. No. 363,589
12 Claims. (Cl. 260—448)

ABSTRACT OF THE DISCLOSURE

Organo aluminum compounds having a high percentage of similar primary organo groups are produced from olefinic materials containing a substantial percentage of internal olefins by placing the internal olefins on aluminum as secondary organo groups; isomerizing the secondary organo groups to primary organo groups, preferably wherein the primary organo group content is about 90 percent and subjecting the product of the isomerizing step to displacement with alpha olefinic hydrocarbon of about the same molecular configuration as the primary organo groups on the aluminum. Olefins obtained from the displacement operation are preferably recycled to the first step for efficient utilization thereof.

---

This invention relates to the preparation of high purity primary organo aluminum compounds and derivatives thereof and in particular to the avoidance of secondary organo groups in such materials.

Primary organo aluminum compounds, particularly those having from about 8 to about 18 carbon atoms per organo groups are materials of substantial importance to the preparation of many products because of the wide variety of unique reactive properties possessed thereby. Although aluminum alkyls typifying such organo aluminum compounds can be produced in a number of different ways, the use of such alkyls as intermediates in the production of high purity primary alcohols and acids requires an extremely high percentage of primary alkyl groups and almost complete absence of "contaminating" secondary alkyl groups. The reason for this is that the reactions involving the conversion of the primary aluminum alkyls to alcohols and acids also involve the secondary aluminum alkyls resulting in the production of secondary alcohols and secondary acids which are not easily separated from the primary alcohols and acids by conventional separation processes such as distillation.

Thus where aluminum alkyls are employed in the production of primary alcohols and acids of high purity it is virtually essential to insure that the primary aluminum alkyls used be at least of the purity desired in the product alcohols and acids. Although it is easy to make such a statement as regards purity of primary aluminum alkyls, the actual realization of the desired high degree of purity on a commercial scale is an entirely different matter.

One typical process for the production of primary aluminum alkyls having a high purity involves the displacement of organo radicals of a branched alkyl group-aluminum compound such as triisobutyl aluminum with an internal olefin such as dodecene-3 having the same number of carbon atoms as is desired in the organo radicals of the aluminum alkyls. In the case of a desired $C_{12}$ primary aluminum alkyl, the displacement produces a tri-sec-dodecyl aluminum which is then isomerized to produce the primary tridodecyl aluminum. This process is described more fully in British Patent 913,358. For the present it is sufficient to observe that the fundamental isomerization reaction is performed in a batchwise manner and represents an equilibrium type of reaction which is relatively slow and which cannot be performed at high temperatures to reduce the reaction time because of the recognized undesired side reactions which occur at temperatures of 230° C. and higher. Thus the reaction time for the isomerization process involves periods of hours and is still an equilibrium proposition making it impossible to reach complete isomerization to the primary aluminum alkyl in any finite reaction time. Although the above identified British patent does not dwell upon this fact it is considered likely, if not probable, that the 95-97 percent purity of alpha olefins produced from primary aluminum alkyls as noted therein is actually a limitation imposed by the equilibrium in the batch isomerization itself. It is observed that while British Patent 913,358 considered 97 percent as high purity, on an alcohol or acid basis it represents 3 percent secondaries which is vastly inferior to the presently desired purities in excess of 99.5 percent.

As is characteristic of equilibrium reactions, the isomerization reaction takes place more rapidly in those regions of conversion further removed from 100 percent. Thus the reaction proceeds rapidly to regions of the order of about 90 percent primary alkyl content, much slower to the 97 percent of the British patent, which even so requires times of the order of hours, and becomes virtually stagnant as one seeks to isomerize beyond the 97 percent figure. Under such lengthy reaction periods the side reactions mentioned as occurring above 230° C. assume greater significance and generally require even lower temperatures. It is seen therefore that one performing the process of the above identified British patent is faced with a virtual alternative in a choice between those which produce high purity products and those which result in reasonable quantities of products in a reasonable reaction time.

Now it has been discovered that the problems inherent in the process identified above can be alleviated to a substantial extent and the limiting factors therein so modified as to permit the production of materials having vastly improved purity, substantially exceeding 99 percent, with reaction times only a fraction of a second greater than those required in the isomerization process itself to achieve purity of the order of 90 percent. The overall reaction times are far shorter than merely the isomerization time required for the 97 percent purity of the British disclosure per se. Significant reduction in the size and required volumetric content of the isomerization reactor is possible resulting in substantial production economics making a 99.7 percent purity material rivaling if not actually bettering the cost of the 97 percent purity material of the prior art process.

This improvement is brought about by modifying the isomerization step of the combined displacement-isomerization process and by adding a displacement step following the isomerization employing an alpha olefin having the appropriate number of carbon atoms per molecule for primary aluminum alkyl to be produced, typically dodecene-1 for production of primary tridodecyl aluminum. The modification of the isomerization process provides a substantial reduction in the hours reaction time. The second displacement reaction occurs at a vastly higher rate than the isomerization reaction and proceeds to virtual completion in a few hundred milliseconds. Thus the practical limitations imposed on purity improvement by the exceedingly slow isomerization rates of a very pure isomerization reaction mass are avoided.

The primary aluminum alkyl thus produced exists in admixture with excess alpha olefin and displaced internal olefin. These olefins are considerably more volatile than the aluminum alkyls and hence are readily separated therefrom by a simple "flash" operation. Once separated they can be utilized in any manner desired, however, it is generally preferable in producing an overall coordinated process that they be returned to the initial displacement step whereby they are placed upon the aluminum by displacement of the organic constituent of triisobutyl aluminum.

In greater particularity it is apparent from the foregoing that the present teaching is applicable to virtually all materials involved in the foregoing British patent. The reactions are typified as those shown in the British patent, however it is to be observed that one is provided with two very attractive possibilities as a result of the present invention. The first of these possibilities may be described by way of introduction in terms of employing as a starting material for the second displacement step of the present invention the 97 percent purity output from the unmodified isomerization step of the process of the British patent. It is apparent that the isomerization step mentioned is the isomerization step following the displacement step of the patent and that the "second" displacement step is in addition to both steps of the patent. With the addition of the second displacement step, it is possible in an additional reaction time of the order of a fraction of a second to convert virtually all of the 3 percent impurity as represented by non-primary alkyl groups to primary alkyl groups. It thus becomes possible to realize purities of the primary aluminum alkyls as well as the derivatives thereof in excess of 99.5 percent, typically 99.7 percent.

As if the foregoing purity improvement were not enough, even greater utility of the present invention particularly as regards production economy without sacrifice of quality is realized when it is employed in connection with a modification of the above prior art process in which the isomerization reaction time is drastically shortened, for example halved, resulting in the production by isomerization of a mixture in which the primary aluminum alkyls are typically 90 percent of the total aluminum alkyls present rather than the basic prior art 97 percent. When the second displacement step of the present process is thus provided with a feed material of 90 percent primary aluminum alkyl purity there is no substantial alteration in the manner of performance thereof, the only significant difference being that the product contains a greater amount of internal olefin which is of no important disadvantage since it is readily flashed as before for recycle to the first displacement step wherein it is placed upon aluminum as secondary aluminum alkyl for the isomerization step of the overall process.

It will be understood that although the foregoing has included mention of a typical 90 percent purity of the aluminum alkyl where the isomerization short circuit technique is employed, that this is by no means limiting and that materials of other purities can be used as feed to the second displacement step. In general a choice as to purity at this point is a matter of economics since a balance must be struck between the cost savings of shorter isomerization times associated with materials of low purity and the costs of recycle of large quantities of internal olefins to the first displacement step. Actually it must be understood that the costs of high volume recycle are represented principally as those involved in material handling and containing rather than increased raw material costs. In some instances low purity of primary alkyl groups may be deliberately arranged, as for example where mixed alkyl groups are desired.

In general the preferred conditions under which the invention is performed are in accordance with the following.

As an illustrative starting point, triisobutyl aluminum is reacted with a two to threefold excess of internal dodecene, which may be a mixture of isomers, in a displacement reactor. This first displacement step yields secondary dodecyl aluminum compounds. This particular displacement step is performed at a temperature from about 150° C. to about 300° C. at a contact time from about 100 milliseconds to about 5 minutes. A preferred temperature is about 225° C. and a preferred contact time is about 10 seconds, chosen to avoid the side reaction disadvantage associated with the higher temperatures and the longer reaction times of the lower temperatures.

The product of the first displacement step constitutes a mixture of internal olefins and secondary aluminum alkyls which is then thermally isomerized to a high percentage of primary dodecyl aluminum at a temperature from about 150° C. to about 250° C. for a period of time from about 10 minutes to about 5 hours. In this instance the shorter times are preferred, permitting and caused by accompanying higher temperatures without significant decomposition, the principal factor being economics of internal recycle of internal olefin as noted in the foregoing. Large recycle volume accompanies low primary aluminum alkyl purity of a typical 50 percent, whereas purities in excess of 90 percent may reduce capacity due to prolonging the isomerization reaction time. In general, a purity of 90–95 percent of primary alkyl groups relative to secondary alkyl groups represents a preferred range.

The product of the isomerization step contains free internal olefins which pass through the process at this point as diluent. Although large quantities of this diluent are not particularly harmful at the next stage of the process, they are not desired because they do increase the volume of material that must be handled and will to some extent interfere with the reaction of the active components. Thus it is generally desired that the product from the isomerization be flashed, as by more or less abrupt pressure or temperature manipulation, removing the olefins and leaving an aluminum alkyl mixture containing from 5–10 percent of secondary alkyl groups. The olefin thus separated is preferably returned in accordance with the foregoing comments relative to process coordination to the first displacement step of the process wherein it is reacted with triisobutyl aluminum.

At the second displacement step, the secondary aluminum alkyls are reacted with an alpha olefin corresponding in number of carbon atoms per molecule to the organic constituent of the aluminum alkyls, typically dodecene-1 where dodecyl aluminum groups are involved, to yield high purity primary tridodecyl aluminum and internal olefin. This reaction is carried out with an excess of alpha olefin above the stoichiometric proportions relative to the secondary aluminum alkyls present, typically from about a 1:1 ratio to about a 5:1 ratio, preferably about 2:1, in terms of alpha olefin to secondary aluminum alkyl groups supplied to the second displacement. In this connection it is observed that relatively pure alpha olefin is generally desired because of the reduced quantities of material that must be handled, however, such is by no means essential since comparatively impure mixtures of the order of 50 percent alpha olefins may be employed. The internal olefins merely pass through this step of the process as diluent material. The ratio between the olefin feed and the secondary aluminum alkyl is normally adjusted in view of the purity of the alpha olefin content to maintain the desired ratio between alpha olefin and secondary aluminum alkyl.

The temperatures and contact times involved in the second displacement reaction depend to some extent upon the configuration of the reactor employed to carry out that step of the process. In the so-called "plug flow" or "Zosel" type of reactor involving basically a concurrent or parallel flow proposition, temperatures from about 280° C. to 320° C. are desired in conjunction with contact times from about 100 milliseconds to about 1 second. A temperature of about 300° C. and a contact time of about 500 milliseconds are more generally preferable as a reasonable compromise between temperature and residence time.

A different form of reactor such as a countercurrent or displacement type of reactor, which is in general similar to a distillation column, involves longer residence times due to the comparatively slow progress of materials through the column, making it desirable to employ lower temperatures to avoid substantial decomposition of the aluminum alkyls involved. For such a countercurrent type of displacement reactor a temperature from about 180° C. to 220° C. is preferred combined with contact times from about 20 seconds to about 1 minute. Again the center of these ranges, typically, 200° C. and approximately 45 seconds contact time are preferred as a desired compromise avoiding the higher temperatures on the one hand and longer reaction time on the other.

The affluent from the second displacement step of the process contains unreacted alpha olefin (dodecene-1) together with internal olefins produced or carried through but otherwise contains aluminum alkyl in which the primary form constitutes in excess of 99 percent, typically 99.7 percent, of the total aluminum alkyl present. This material is in a form which is an excellent raw material for the production of 99.7 percent pure alcohols and carboxylic acids, as well as alpha olefins, utilizing known processes. As an example of such processes, 99.7 percent pure 1-dodecanol is produced by the oxidation of primary aluminum alkyl to dodecyl aluminum alkoxide which is then flashed to remove olefins for recycle. The alkoxide thus obtained is hydrolyzed with 20 percent sulfuric acid to yield the desired alcohol.

*Example*

Triisobutyl aluminum is reacted with a threefold excess of (based on alkyl groups) of dodecene-2 in a first displacement reactor at 225° C. for 10 seconds.

The secondary dodecyl groups thus placed on aluminum are isomerized to a high percentage of primary dodecyl groups in a reactor at 225° C. for 30 minutes producing a mixture in which the primary alkyl groups constitute approximately 90 percent of the total alkyl groups linked to aluminum.

The olefins accompanying the isomerized aluminum alkyl are flashed before removal of the alkyl from the isomerization reactor and returned to storage for feed to the first displacement reactor.

The aluminum alkyl remaining after olefin flash is reacted with a twofold excess (based on alkyl groups) of a 2 to 1 mixture of dodecene-1 and tetradecene-1 in a second displacement reactor of the parallel flow type at 300° C. for 500 milliseconds.

The product contains aluminum alkyl group distribution as follows:

| | Percent |
|---|---|
| Primary dodecyl | 96.8 |
| Primary tetradecyl | 2.9 |
| Secondary dodecyl | 0.3 |

The product also contains:

Dodecene-1
Dodecene-2
Tetradecene-1 in which the dodecene-2 is increased over the small percentage remaining in the feed to the second displacement reactor, this increase brought about by the displacement of secondary alkyl groups contained on aluminum with dodecene-1 and tetradecene-1 forming dodecene-2.

From the foregoing, it is apparent that considerable modification of the present invention is possible without exceeding the scope thereof as defined in the appended claims.

What is claimed is:
1. The process for producing hydrocarbon compounds of aluminum in which the hydrocarbon groups are higher than ethyl and are linked to aluminum at a terminal carbon atom comprising, forming an organo aluminum compound having displaceable organo groups,
displacing at least part said organo groups with an internal olefinic hydrocarbon having a significant content of internal unsaturation and having from about 8 to about 18 carbon atoms per molecule whereby is produced internal linkage organo aluminum compounds having aluminum linkage to an internal carbon atom,
isomerizing the hydrocarbon-aluminum linkage of a substantial portion of the internal linkage organo aluminum compounds to a linkage to a terminal carbon atom,
and displacing substantially all the remaining internal linkage hydrocarbon groups of the product of the isomerizing step with vinyl alpha olefinic hydrocarbon in which at least a substantial portion has the same number of carbon atoms per molecule as the internal olefinic hydrocarbon, the second displacing step being from about 180° C. to about 320° C. at a contact time from about 100 milliseconds to about one minute.

2. The process of claim 1 wherein the olefinic hydrocarbons have the same numbers of carbon atoms per molecule.

3. The process of claim 1 wherein the isomerization step proceeds to a state wherein the hydrocarbon-aluminum linkage to terminal carbon atoms of the hydrocarbon groups constitutes greater than about 50 percent of the total hydrocarbon linkage to aluminum.

4. The process of claim 1 wherein the isomerization step proceeds to a state wherein the hydrocarbon-aluminum linkage to terminal carbon atoms of the hydrocarbon groups constitutes from about 50 percent to about 97 percent of the total hydrocarbon linkage to aluminum.

5. The process of claim 1 wherein the isomerization step proceeds to a state wherein the hydrocarbon-aluminum linkage to terminal carbon atoms of the hydrocarbon groups constitutes from about 65 percent to about 90 percent of the total hydrocarbon linkage to aluminum.

6. The process of claim 1 wherein the isomerization step is terminated when about 95 percent of the aluminum-hydrocarbon linkage is to a terminal carbon atom.

7. The process of claim 1
wherein the internal olefinic hydrocarbons involved in the first displacement have substantially a single number of carbon atoms per molecule,
and wherein the isomerization step proceeds to a state in which the hydrocarbon-aluminum linkage to terminal carbon atoms of the hydrocarbon groups constitutes from about 65 percent to about 90 percent of the total hydrocarbon linkage.

8. The process of claim 1 wherein the displacement with internal olefinic hydrocarbon occurs at a temperature from about 150 to about 300° C. and at a contact time of from about 100 milliseconds to about 5 minutes.

9. The process of claim 1 wherein olefinic hydrocarbons are removed from the aluminum-hydrocarbon materials following the second displacement step and recycled to the first displacement step.

10. The process of claim 1 in which the olefinic hydrocarbons are dodecenes.

11. The process of claim 1 in which the displaceable organo groups are triisobutyl and the olefinic hydrocarbons are dodecenes.

12. In a process for producing primary hydro-carbon compounds of aluminum in which the hydrocarbon groups are higher than ethyl and substantially all are linked to aluminum at a terminal carbon atom by processing involving isomerization of the hydrocarbon groups from ones with linkage of the aluminum to internal carbon atoms to ones with linkage of the aluminum to terminal carbon atoms, the improvement of:
conducting the isomerization to a state wherein the percentage of terminal linkage hydrocarbon groups is substantially less than 100 percent, and then subjecting the isomerization product to displacement with alpha olefins in which at least a substantial portion has the same number of carbon atoms per molecule as the hydrocarbon groups at a temperature from about 180° C. to about 320° C. and at a contact time from about 100 milliseconds to about one minute, whereby substantially all the remaining hydrocarbon groups having internal carbon atom linkage to aluminum are removed and replaced with hydrocarbon groups having terminal carbon atom linkage to aluminum.

References Cited

UNITED STATES PATENTS

| | | | |
|---|---|---|---|
| 3,210,435 | 10/1965 | Kennedy et al. | 260—448 |
| 3,277,203 | 10/1966 | Keehan et al. | 260—448 |
| 3,282,974 | 11/1966 | Bruno et al. | 260—448 |

HELEN M. McCARTHY, *Primary Examiner.*

TOBIAS E. LEVOW, *Examiner.*